Figure 1:
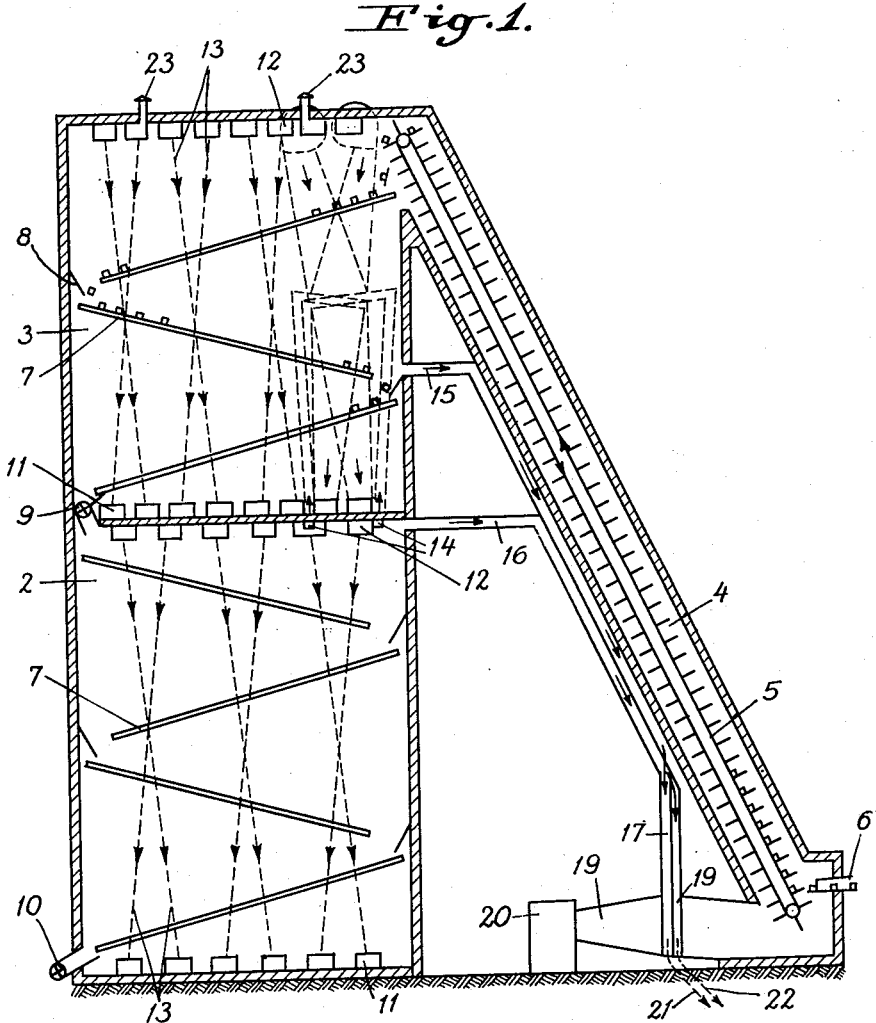

Sept. 16, 1952 C. O. RASMUSSEN 2,610,412
PLANT FOR DRYING OF SOLID MATERIALS
Filed Oct. 17, 1949 2 SHEETS—SHEET 1

INVENTOR.
C. O. Rasmussen
BY
Attys.

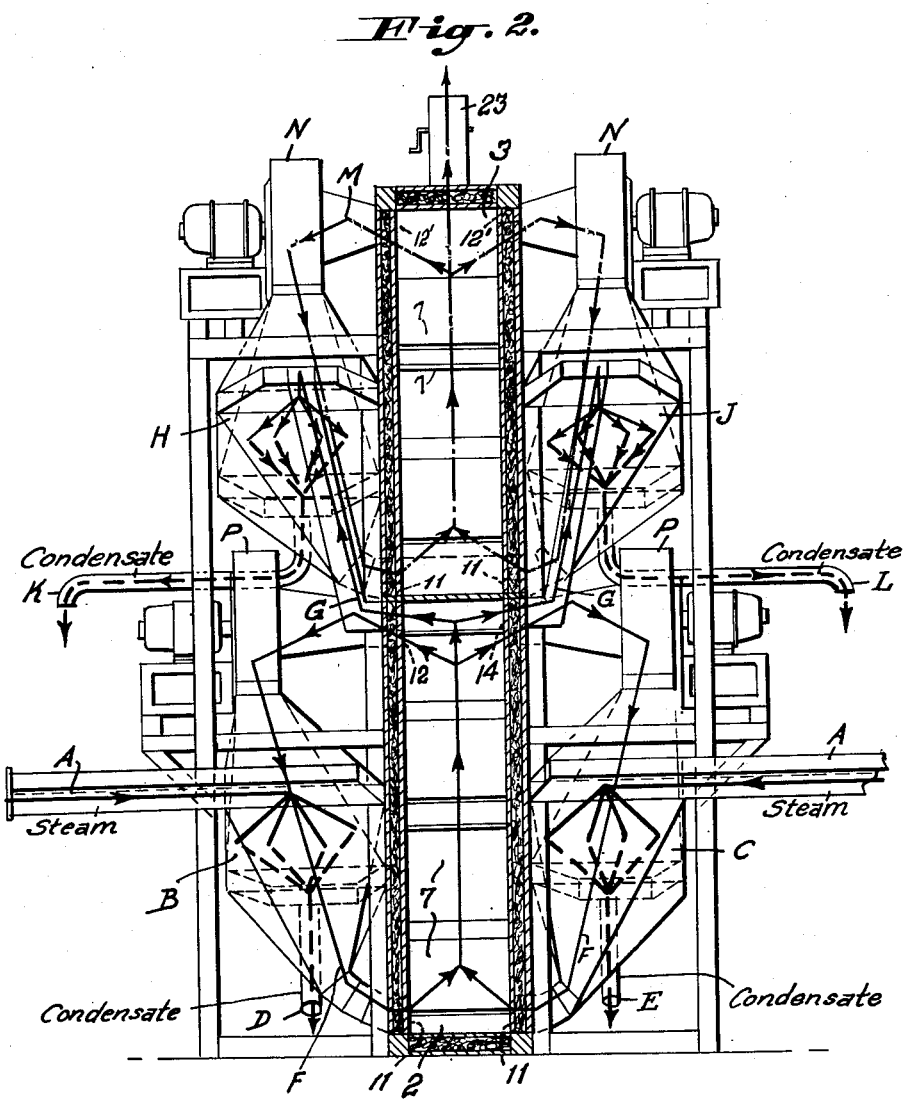

Patented Sept. 16, 1952

2,610,412

UNITED STATES PATENT OFFICE 2,610,412

PLANT FOR DRYING OF SOLID MATERIALS

Christian Oskar Rasmüssen, Copenhagen, Denmark

Application October 17, 1949, Serial No. 121,733
In Denmark October 20, 1948

4 Claims. (Cl. 34—86)

The invention relates to a plant for the drying of solid materials of relatively high humidity.

It is a known method for such purposes to use drying towers in which the material is carried throughout the tower in both lateral and vertical direction along special zig-zag paths, for example, a series of conveyors or baffles placed one above the other throughout the entire height of the tower. During the travel of the material through the tower a stream of warm, dry air flows thereover for drying the same, this air being at suitable places drawn out, reheated and reintroduced into the tower.

The plants of this kind hitherto known have, however, suffered from certain defects and disadvantages. Thus, in such plants it is usual to use a vertical bucket elevator from which the moist material is dumped down upon the uppermost conveyor or inclined plate in the tower. By this method of feed, the moist material will in many cases break up and crumble. Another disadvantage in the known drying towers is that it is difficult to control the absorption of the drying air in the different conveyors in the tower, inasmuch as the air which has been cooled by the material will have a tendency to descend to the bottom of the tower where the material has its maximum dryness and temperature, while the warm drying air supplied at the bottom of the tower will tend to rise to the top of the tower.

It is the object of the present invention to remove these disadvantages.

According to the invention the upper end of the tower is provided with an extension inclining towards the ground and forming a shaft which contains a conveyor by means of which the material may be carried to the top of the tower, the material being during its travel through the shaft preheated by means of dry, warm air introduced at the bottom of the shaft from a heat exchanger in which the drying air is heated by drying air drawn out at suitable places in the tower. By this predrying of the material the advantage is gained that it will be of such dryness that it will not break up when dumped down upon the conveyors in the tower.

Another advantage of a plant according to the invention is, that a considerable increase of the capacity of the plant is attained, as the speed of the inclined conveyor may be increased beyond that of the other conveyors, so that the moist material from the feed hopper may be placed on the elevator conveyor at suitable intervals and will suffer no damage, whereas after the pre-drying it may be carried along by the other conveyors pell-mell without sustaining damage.

These conveyors may suitably consist of vibrating plates so arranged as to slope alternately to one side and the other. By using sloping vibrating plates instead of conveyors the advantage is derived that new sides of the material will be presented to the air blast.

The invention particularly relates to a drying tower which by horizontal or almost horizontal partitions is divided into two or more chambers, the upper one of which is extended at an incline towards the ground by the above-mentioned shaft-forming extension. Each of the said chambers has its own separate circuit of drying air, and the partitions are according to the invention provided with sluice gates so that the material may continue its vertical passage through the tower. The said partitions thus divide the interior of the tower into closed sections within which the temperature and flow of air may be controlled separately, so that the desired dryness of the material may be obtained before it passes into the next chamber.

According to the invention the desired drying conditions in the chambers are attained in a most economical manner, in which the drying air, from any of the chambers is led away through an external passage in which the air is heated in a heat exchanger by means of drying air from one or more of the lower chambers. The drying air in the lowermost chamber must, of course, be heated by an external source of heat, such as, for example, electric heating elements, exhaust gases from an internal combustion engine, or the like.

As an alternative external heat source may be used for the heating of all heat exchangers. The optimum temperature conditions will as a rule be attained by a combination of the two alternatives, an external heat source being used to supplement the heating in the heat exchangers.

The invention will now be described with particular reference to a plant for drying solid materials of relatively high humidity and materials that are frangible when moist, such as bricks, in which:

Figure 1 is a diagrammatic view partly in section and partly in elevation of the plant in accordance with the invention; and Figure 2 is a view partly in section and partly in elevation and looking to the right of Figure 1.

In the drawings, the drying plant includes wall means defining a tower which is by means of a partition 1 divided into two chambers 2 and 3, the upper chamber 3 being provided with an extension 4, which in the form of an inclined shaft leads to the ground. The conveyor 5 passing through this shaft is extended into the tower and thus forms the upper conveyor in the tower. On this conveyor the material which is being fed continuously into the plant from a hopper 6 will be carried up to the upper part of the tower, whereupon the sloping conveyors or inclines 7 will carry it down through the tower along the abovementioned zig-zag paths, first through chamber 3 and then through chamber 2, the material being transferred from one incline to the incline below by means of a guide 8, which directs and guides the material to the incline below, whereas the continuous passage of the material from one chamber to the next takes place through the sluice-gates 9 and its final removal from the plant through sluice-gate 10. The conveyor 5 moves at a rate mainly determined by the rate of feed from the hopper 6, whereas the speed of movement of the rest of the conveyors may be determined in connection with the dimensioning of the drying plant so that the optimum capacity may be obtained.

The plant is provided with external passages with suction and heat exchange devices as set forth hereinafter, which draw the drying air cooled and saturated by the material out through a number of openings 12 at the tops of the chambers. This air passes through heat exchangers so as to be heated and introduced into the tower through openings 11 at the bottom of the chambers. As mentioned in the foregoing it will in many cases be necessary by way of a supplement to use external sources of heat for the heating of the fresh, dry air in the heat exchangers.

As regards Figure 1, the external passageways are denoted diagrammatically in dotted lines.

In connection with Figure 2 which illustrates the air flow through the chambers of the tower and through the various heat exchange devices, externally of the tower proper is provided a framework supporting the various external passageways, pumps, motors and the like. Steam enters through steam denoted by a full line with arrows indicating direction of flow flows through tubes A on the right and left hand sides of Figure 2 and flows through heat exchangers B and C where it gives off its heat and leaves as condensate through drain tubes D and E. The heat of this steam is given off to air that is circulated through the heat exchanger. The air currents are shown in connection with the lower chamber 2 at F and the air after passing through heat exchangers B and C enters lower chamber 2 through the openings 11 at the bottom thereof. The warm air flows upwardly through chamber 2 heating the material on the inclines of the sloping plates 7 and the air takes up humidity from the material. At the top of chamber 2 the air of reduced temperature leaves through the side openings 12 for recirculation through heat exchangers B and C. A certain amount of air however is exhausted through the rear outlet 16 shown in Figure 1 whence it passes downwardly through heat exchanger chamber 18 and to atmosphere as indicated at 22 and as set forth hereinafter. This heated air gives up its heat to fresh air coming into the plant through the duct or conduit 19. The amount of air leaving chamber 2 will be compensated for by air flowing down from chamber 3 in which a certain pressure above atmosphere is maintained whereby material passing through sluice gates 9 will be assisted by air flow. Similarly due to the actions of the fans P, a pressure above atmosphere but of smaller value will be maintained in chamber 2 so that the discharging material leaving the plant through the sluice gate 10 in Figure 1 will likewise be assisted by an air current.

The air that is circulating in lower chamber 2 is also fed off through openings 14 at the top of this chamber to heat exchangers H and J positioned alongside of the upper chambers 3. This warm air that leaves lower chamber 2 and flows to heat exchangers H and J is indicated at G and it gives up its heat in these heat exchangers and leaves as condensate through tubes K and L in almost the same condition as the condensate that is leaving through tubes D and E.

The heat that is given up in heat exchangers H and J is transmitted to air circulating through upper chamber 3 and indicated by the broken line M. This air having been heated in heat exchangers H and J enters the lower portion of the upper chamber 3 through the openings 11 above the partition 1 that separates upper and lower chambers and passes upwardly through chamber 3 giving off its heat to the material on incline 7 and extracting moisture therefrom. The heated air is withdrawn from the upper chamber 3 by fans N in communication with openings 12' at the top of chamber 3 on each side thereof and this air is recycled through heat exchangers H and J. The fans P and N are electric motor driven.

In connection with this heat exchanger relationship, the closed air circuit in the upper chamber 3 will not be able to heat the material on the conveyors to the extent that it is heated and dried by the air circuit in the lower chambers.

The moisture absorbed by the air in the upper chamber 3 will, to a small extent, escape through sluice gate 9 controlling passage of material between the chambers but a far greater amount of moist air is discharged from the upper chamber through the rear opening 15 in Figure 1 so as to pass through heat exchanger chamber 17 and give up its heat to incoming fresh air prior to leaving the plant as at 21.

The incoming fresh air is sucked through the fan 20 indicated in Figure 1 through duct 19 over the heat exchanger chambers 17 and 18 and thence into the inclined shaft 4 from whence it passes upwardly and enters the top of chamber 3 together with the material to be dried.

The vent valve 23 is provided at the top of chamber 3 so as to control the amount of moist air that may be allowed to escape from chamber 3 in order to maintain pressure conditions within this chamber.

In the installation described, the air leaving passages 14 and flowing through heat exchangers H and J is at a temperature of approximately 100° C. so as to give up heat to the air to be circulated through the upper chamber 3.

In the embodiment of the invention shown in the drawing, preheating of the material carried up through the shaft 4 on the conveyor 5 will be obtained by circulating air of temperatures approaching 55° and 100° centigrade, taken from chambers 3 and 2, respectively, taken through passages 15 and 16, respectively, to chambers 17 and 18 of a heat exchanger inserted in passage 19, through which air from the supply fan 20 is fed to the lowermost end of the shaft 4.

The circulating air will give off its heat in the heat exchanger and will raise the temperature in passage 19 to about 25° centigrade, and this air will now be taken through shaft 4 for the preheating of the material, while the moist, cool air will be led into the open through the condensate dischargers 21 and 22 from chambers 17 and 18, respectively.

The conveyors or inclines used in the plant may expediently be in the form of nets or lattices, so that an intimate contact between the material and the drying air will be ensured.

It is therefore clear that the present invention provides a plant for drying solid materials of relatively high humidity and materials that are frangible when moist including a drying tower which is divided into upper and lower compartments 3 and 2. Within the tower are inclines 7 which are oppositely disposed and upon which the materials to be dried drop from incline to incline to move both laterally and vertically through the tower and in which the lower end of one incline is adjacent the upper end of the other with the inclines extending in series throughout the tower. Sluice means 9 provide communication between the compartments and through which the material to be dried passes from the upper to the lower compartments. The tower is provided with discharge means in the form of another sluice 10 at the bottom of the lower compartment. Each compartment is provided with a series of upper and lower respective air inlet and air outlet openings therein and circulating air means are provided exteriorly of the compartments communicating with the respective upper and lower openings and including blower means and heat exchangers so that air can be withdrawn from the top of the compartments, heated and introduced into the bottom of the compartments. This air sweeping over the material dropping through the tower for drying and extracting moisture therefrom. The tower is provided with means constituting an extension of the top of the same extending at a downward incline and defining a shaft or tunnel and a conveyor is provided within this tunnel for feeding the material from the bottom of the tunnel up to the top of the tower. Suitable means such as the hopper 6 are provided for feeding the material to be dried to the conveyor in the tunnel. The invention further provides dry air preheating means for the material and includes a conduit or passage communicating with the bottom of the tunnel, means for forcing air through this conduit into the bottom of the tunnel and heat exchanger means within the conduit, with additional conduits communicating at one end with the respective chambers of the tower and at their other ends with the heat exchanger means in the conduit so that air passing out of the chambers flows through the heat exchanger means in the inlet conduit for preheating the dry air admitted to the tunnel so as to preliminarily remove moisture from the material during its passage on the conveyor to the top of the tower to prevent the material from crumbling in its gravity fall and descent through the tower.

Having now described my invention, what I claim as new and desire to secure by Letters Patent is:

1. In a plant for drying solid materials of relatively high humidity and frangible when moist including a drying tower, means within the tower for conveying the material both laterally and vertically including oppositely disposed inclines the lower end of one being adjacent the upper end of the other and extending in series throughout the tower with the solid materials dropping from incline to incline, means for introducing a blast of warm dry air into the tower, means for drawing off air at intervals from the tower, reheating the same and re-introducing it into the tower, means constituting an extension of the top of the tower extending at a downward incline, said extension defining a shaft, a conveyor disposed within the shaft and communicating with the top of the tower, a conduit in communication with the bottom of the shaft, a heat exchanger in said conduit, means for forcing a current of air over said heat exchanger through said conduit and into said shaft, and conduits extending from the tower to said heat exchanger whereby the air flowing out of the tower through said last mentioned conduits gives up its heat to the fresh air blown through the conduit communicating with the shaft to preheat the solid material carried by the conveyor.

2. In a plant for drying solid materials of relatively high humidity and frangible when moist, a drying tower, oppositely disposed inclines extending from top to bottom throughout the tower with the lower end of one incline spaced above the upper end of the subjacent incline whereby the solid material drops from incline to incline throughout the height of the tower, upper and lower openings provided in the tower, external passages respectively connecting the upper and lower openings, a heat exchanger and blower means incorporated in the passages withdrawing air from the upper openings, heating the same and introducing it into the lower openings in the tower to circulate warm dry air over the material moving by gravity down the inclines, the upper end of the tower having a closed extension constituting a shaft extending downwardly therefrom, a conveyor within the shaft communicating with the top of the tower and carrying the material to be dried to the uppermost incline, conduit means communicating with the bottom of the shaft, heat exchanger means disposed in said conduit means, means for introducing air into said conduit means to flow over said heat exchanger and at least one conduit extending between the heat exchanger and the tower through which air from the tower enters the heat exchanger to give up its heat to air flowing through the conduit means so that this air is heated and constitutes a preliminary heating means for preheating the material on the conveyor.

3. A plant for drying solid materials, means dividing the drying tower into upper and lower compartments, oppositely disposed inclines in each compartment and upon which the materials to be dried drop from incline to incline, sluice means providing communication between the compartments and through which the material to be dried passes from the upper to the lower compartment, discharge means at the bottom of the lower compartment, each compartment having a series of upper and lower respective air inlet and outlet openings therein, circulating air means exteriorly of the compartments communicating with the respective upper and lower openings and including a blower and a heat exchanger whereby air is withdrawn from the top of the compartments, heated and introduced into the bottom of the compartments and which air sweeps over the material dropping through the tower, an inlet tunnel through which the material passes extending from the top of the tower downwardly at an angle, a conveyor within the tunnel extending to the top of the tower, means for feeding material into the bottom of the tunnel to the conveyor, dry air preheating means for the material including a conduit communicating with the bottom of the tunnel and means for forcing air through said conduit into the bottom of the tunnel, a heat exchanger within said conduit and conduits communicating at one end with the respective chambers and at their other ends with the heat exchanger whereby air passing out of the chambers, into and through the heat exchanger in the conduit preheats the dry air admitted to the tunnel so as to preliminarily remove moisture from the material during its passage on the conveyor to the top of the tower to prevent the material from crumbling in its gravity fall and descent through the tower.

4. A plant for drying solid materials as defined in and by claim 3 in which the conveyor in the tunnel has a greater speed than the gravity descent of the material through the chambers.

CHRISTIAN OSKAR RASMÜSSEN.

REFERENCES CITED

The following references are of record in the file of this patent:

UNITED STATES PATENTS

| Number | Name | Date |
|---|---|---|
| 47,596 | Chichester | May 2, 1865 |
| 1,009,422 | Larsen | Nov. 21, 1911 |
| 1,369,411 | Edwards | Feb. 22, 1921 |

FOREIGN PATENTS

| Number | Country | Date |
|---|---|---|
| 797,180 | France | Feb. 8, 1936 |